(12) United States Patent
Brock et al.

(10) Patent No.: US 6,510,156 B1
(45) Date of Patent: Jan. 21, 2003

(54) METHOD AND APPARATUS FOR DATA STREAM OPTIMIZATION

(75) Inventors: J. Christopher Brock, Union City, CA (US); R. Lee Franzen, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/206,834

(22) Filed: Dec. 7, 1998

(51) Int. Cl.[7] .............................................. H04L 12/28
(52) U.S. Cl. ..................................... 370/395.1; 370/392
(58) Field of Search ........................... 370/395.1, 395.2, 370/395.5, 395.52, 395.6, 400, 401, 389, 422, 473, 474, 470, 392

(56) References Cited

U.S. PATENT DOCUMENTS

| | | | |
|---|---|---|---|
| 5,323,389 A | 6/1994 | Bitz et al. ..................... | 370/397 |
| 5,414,701 A | 5/1995 | Shtayer et al. ............ | 370/395.3 |
| 5,479,401 A | 12/1995 | Bitz et al. ..................... | 370/397 |
| 5,559,959 A | 9/1996 | Foglar .......................... | 714/43 |
| 5,642,421 A | 6/1997 | Gray et al. .................. | 713/160 |
| 5,717,689 A | 2/1998 | Ayanoglu .................... | 370/349 |
| 5,745,837 A * | 4/1998 | Fuhrmann .................... | 725/114 |
| 6,075,787 A * | 6/2000 | Bobeck ..................... | 370/395.2 |
| 6,229,808 B1 * | 5/2001 | Teich et al. .................. | 370/398 |

\* cited by examiner

*Primary Examiner*—Dang Ton
*Assistant Examiner*—Brian Nguyen
(74) *Attorney, Agent, or Firm*—Hamilton, Brook, Smith & Reynolds, P.C.

(57) ABSTRACT

A method and apparatus for data stream optimization is provided. Optimization is achieved by reducing the amount of redundant data that needs to be sent over a communications link in a communications network, such as an ATM network. When redundant data is detected in a stream, such as duplicate header information, the sender optimizes the stream by removing redundant data before sending the stream over the link. Preferably, the steam is a stream of ATM cells and the process removes header information from cells having similar header information. The receiver detects an optimized stream either by calculating a header value on data received in the stream and determining if the calculated header value is equal to a byte values where the calculated values should appear in the received data, or by comparing a shortened header value transmitted with the payload of a cell to a saved header value. The method and apparatus thus produce optimized cells, such as ATM cells having 48 or 49 bytes in total length which can be created, transmitted, and received over a network. When the receiver detects an optimized (i.e., payload-only or shorted header cell), the receiver concatenates a previously saved portion of redundant data to the optimized cell in the stream to create an regular cell stream. The optimized cell with the appended saved header information then matches the original unoptimized cell stream. This invention may be utilized in ATM switching equipment produced by Cisco Systems, Inc. of San Jose, Calif.

26 Claims, 5 Drawing Sheets

CELL TRANSMISSION OPTIMIZATION

FIG. 2A - PRIOR ART

CELL TRANSMISSION OPTIMIZATION

ALTERNATIVE CELL RECEPTION OPTIMIZATION

METHOD AND APPARATUS FOR DATA STREAM OPTIMIZATION

FIELD OF THE INVENTION

The present invention relates to ATM data communications switches and switching protocols and more specifically to optimization techniques that may be used in ATM data communications switches and protocols to reduce cell size and thereby increase overall communication bandwidth.

BACKGROUND OF THE INVENTION

In digital communications networks, data, packed in frames, packets or cells, is routinely transmitted over links between many nodes. The data itself is stored and communicated as a series of binary digits (bits) represented by zeros and ones. During data communications, the manner in which the bits of data are specifically arranged and the order in which they are exchanged between devices is called a protocol. Protocols are usually established by industry standards (e.g., TCP/IP, ATM, ADSL). There are many different types of protocols serving different purposes, but each typically involves sending data arranged in one specific manner, and receiving data arranged in that same manner. For example, blocks of data can be reduced in size by compression protocols that utilize standard compression algorithms before transmission from a sending node in order to conserve bandwidth. Upon reception, the blocks are decompressed to obtain the data in a useable state.

Two popular data communications protocols that have been developed to transmit data over networks are Asynchronous Transfer Mode ("ATM") and Asymmetric Digital Subscriber Line ("ADSL").

Asynchronous Transfer Mode technology is based on the efforts of the International Telecommunication Union Telecommunication Standardization Sector (ITU-T) Study Group XVIII to develop Broadband Integrated Services Digital Network (BISDN) for the high-speed transfer of voice, video, and data through public networks. ATM is capable of transferring voice, video, and data through private networks and across public networks. ATM uses very large-scale integration (VLSI) technology to segment data (for example, frames from the data link layer of the OSI reference model) at high speeds into units called cells. In a standard ATM system, each cell consists of 5 octets of header information and 48 octets of payload data. Cells transit ATM networks by passing through devices known as ATM switches, which analyze information in the header of each cell to switch that cell to the output interface that connects the switch to the next appropriate switch as the cell works its way through the network to its destination.

ATM is a cell-switching and multiplexing technology that combines the benefits of circuit switching (constant transmission delay and guaranteed capacity) with those of packet switching (flexibility and efficiency for intermittent traffic). Like X.25 and Frame Relay, ATM defines the interface between the user equipment (such as workstations and routers) and the network (referred to as the User-Network Interface, or UNI). This definition supports the use of ATM switches (and ATM switching techniques) within both public and private networks.

ADSL is a modem technology for use over twisted-pair telephone lines. ADSL can transmit more than 6 million bits per second ("Mbps") to a subscriber and as much as 640 thousand bits per second ("Kbps") bi-directionally. A conversation between two ADSL modems creates three information channels: a high speed downstream channel, a medium speed duplex channel and a Plain Old Telephone Service ("POTS") channel. Data rates depend upon a number of factors, including the length of the copper line, the wire gauge, the use of bridges taps and cross-coupled interference. Signal attenuation increases with line length and frequency, and decreases as wire diameter increases. The American National Standards Institute ("ANSI") working group T1E1.4 has approved an ASDL standard at rates up to 6.1 Mbps (ANSI Standard T1.413).

In either ATM or ADSL, connections are established between a sender and a receiver. A typical data transmission may involve the transmission of hundreds, or even thousands of cells from the sender to the receiver. A connection is basically a dedicated path through the network upon which these cells of data travel during the transmission of data from the sender to the receiver. A connection based networking scheme such as ATM thus sets-up or pre-defines a specific path between two machines within each ATM switch along the link between the two machines.

By way of example, if there are a series of ATM switches that create a network path between a sending and receiving host, as the first cell of a stream of data enters the network, the first ATM switch will determine the most appropriate "next switch" to which that cell should be switched. The first switch then creates a connection within itself (i.e., using software to configure the switches switching hardware) for future cells destined for the receiver. As the first cell makes its way to each successive ATM switch, each switch sets-up its own connection for cells between the sender and receiver. Once the first cell has made it to the receiver, subsequent cells may be quickly switched using the pre-established connections which remain configured until the sender and receiver no longer need to communicate. To switch each cell, the header portion of the cell is used to determine which connection is associated with the cell and therefore which port the cell should be switched to. When the connection (i.e., the communication session) is over and there are no more cells to be transmitted, each ATM switch can takedown its connections.

Though ATM cells are only 53 bytes in length, prior art systems have been developed to decrease the transmitted cell size to increase overall network bandwidth. U.S. Pat. No. 5,414,701, entitled "Method and data structure for performing address compression in an asynchronous transfer mode (ATM) system", discloses a system which uses address compression in an ATM cell. In this system, before transmission of the cell, the address is compressed and replaced by a virtual path identifier referred to as a link. The link is computed based on the address and header information and is shorter in length than the overall header. Once the cell is transmitted and as it traverses the network, each switch that encounters the cell looks up the link appended to the cell in a link table maintained at the switch. The link table indicates the eventual destination for that cell, based on the cells unique link. As such, the switch can direct the cell in the appropriate direction. Essentially, before transmission, a link is appended to each cell based on a computation derived form the original cell header information. There may be a number of different links in use within a network, each signifying a specific connection (i.e., source and destination communication session).

SUMMARY OF THE INVENTION

Various problems are inherent in systems for reducing header information within cells transmitted on a network, such as those systems noted above. Existing systems and devices for processing ATM cells must transmit header information (including addressing and/or link information) with every ATM cell sent. In normal ATM systems, this header information creates significant overhead. Specifically, five bytes of header are sent for every 48 bytes of data sent in a standard ATM cell, and at least a link must be appended to each cell in the address compression mode noted above. Moreover, using the link mechanism for address compression requires a complex calculation to be made for each cell. The cell header must be matched to any one of a number of existing links, and then the header must be replaced by the matching link. If a link does not yet exist for the header of a current cell, a new link must be created and propagated throughout the switching network. Each switch must also maintain up-to-date link tables in order for throughput to remain efficient.

In all cases of prior art cell switching systems, cell header overhead reduces the bandwidth available over a given link thus reducing the amount of data and/or number of users that can avail themselves of a given link. Over serial links (e.g., ADSL) this often reduces the effective reach for a given data rate. Often the full cell headers and the token-based cell headers contain identical addressing or token information. Thus, for a connection that uses thousands of cells during a single session, the header or token overhead can become quite substantial.

The present invention detects situations in which redundant header or cell information would be sent by comparing information in an instant cell with stored information from a previous cell, and eliminates the redundant information (optimization). Preferably, redundant information is all or some portions of the header of a stream of cells. The receiving end of the transmission detects arrival of an optimized (i.e., reduced size) cell either by performing a calculation on incoming data and/or by examining a portion of the cell against a previously saved portion of the cell. If the calculation produces a matching result, or if a received header value is not equal (i.e., is not equivalent in value) to a saved header value from a former cell, then the cell is a full sized (i.e., un-optimized) cell. In one embodiment, instead of a calculation, a header field used for Header Error Control (HEC) is used as the header value in a comparison and the Header Error Control field is compared with a saved Header Error Control field from a former cell that was previously received. If the calculation produces a non-matching result or if the Header Error Control field is the same as a formerly saved Header Error Control field, the cell is an optimized cell and thus is shorter in length (i.e., number of bits transmitted which constitute the cell) and a formerly saved complete header is appended to the cell, thus returning the optimized cell to a cell of a standard size.

In one embodiment, an unoptimized (i.e., standard sized) cell size is 53 bytes and an optimized cell is transmitted without a standard five byte header (which includes the Header Error Control field as one of the five header bytes) and is thus 48 bytes in size. Upon reception of an optimized headerless cell, the header (5 bytes) of a formerly received cell will be appended to the 48 byte cell transmitted to re-create a normal 53 byte cell. To detect that the incoming optimized cell bytes do not have a header, a calculation is done that determines if the first few bytes received (e.g. the first five) are representative of a standard cell header or not. If not, then it is assumed the cell being received is an optimized cell.

The present invention overcomes the problems in the prior art by increasing the bandwidth of a link without significantly adding to the processing cost of transmitting that data. The optimization system of the invention, by saving and eliminating redundant data, is very efficient and cost effective to implement. The implicit signaling that an optimized cell is present (by examining the bytes of data which make up a cell and using either the calculation or detection of a shortened header) is an elegant way to communicate information without the overhead of adding additional data in the form of a full sized header to the transmission.

Compatibility with existing data communications devices and techniques is achieved by way of industry standard handshaking. That handshaking allows the invention to be implemented in devices that can communicate with devices that recognize standard ATM or other data communications formats as well as those that do not.

According to one aspect of the invention a method and apparatus for propagating a data stream of cells is provided. In operation, upon transmission of a cell, a first portion of a cell of the data stream is compared against a previously saved first portion of a former cell of the data stream. The first portion is preferably a header portion, or alternatively, the first portion can be the entire header, or certain fields of the header, or just one field. An optimized second portion of the cell of the data stream is then transmitted if the previously saved first portion of the former cell of the data stream equals the first portion of the cell of the data stream, without disrupting a sequence of cells of the data stream. Preferably, the optimized second portion is the data field of the cell. The optimized second portion of the cell of the data stream is smaller in size than an entire portion of the cell of the data stream. That is, the entire portion is the header fields and data field, while the optimized second portion is either the data field only or the data field and a shorten header. Thus the selective transmission of either the entire portion of the optimized second portion is done at the transmitting device. The system then saves the first portion of the cell of the data stream if the previously saved first portion of a former cell of the data stream does not equal the first portion of the cell of the data stream. Then, an entire portion of the cell of the data stream is transmitted and the saving process results in a new saved first portion of a cell of the data stream. That is, if the next cell to be transmitted is different than a former cell, the header of the next cell is saved as a new first portion.

Thus, if two or more consecutive cell headers are the same, in one embodiment, only the payload or data portion of the cells is transmitted and is referred to herein as an optimized cell. If a cell (i.e., next cell in a stream) to be transmitted is different (i.e., has different header information), its header is saved and it is transmitted in full as an entire cell so the receiver can also save its header. Then, as subsequent cells are transmitted, if their headers are all the same as the most recent saved header, only their payloads are sent. The receiver can do data checks on the receiver payload-only cell to determine if it is an optimized payload-only cell or if it is a full sized cell. These data checks are the calculations and header field comparisons noted above. Optimized cells then have the saved header appended to them at the receiving end and are passed on for further processing.

In an alternative embodiment, instead of transmitting absolutely no header information, the data or payload field of a cell is sent along with only the header error correction field of the original cell header. Thus, the optimized cell is 49 bytes, with 48 bytes being used for the data or payload field and the $49^{th}$ byte being the HEC field. This is more advantageous than prior art systems which optimize cell lengths by using specially calculated tokens as shortened headers since in this invention, no token must be computed as the HEC is readily available from the header itself.

In alternative embodiments, there may be more than one saved header portion as determined by a number of simultaneous connections. This would be the case where many connections are multiplexed through a common transmitter. Thus, a stream of cells destined for one host (and thus having common header information) can be stripped of their headers as they are sent, and also, one or more other streams of cells can have header information stripped as well, assuming the cells in each stream have common header information, respectively per stream. In other words, the basic principles of the invention are expanded in alternative embodiments to cover more than one stream of cells to be transmitted as optimized cells. The only difference is that the transmitter of multiple optimized streams must keep a copy of the header portions of the most recently sent cells for each stream in which cells having a common header are transmitted.

In another embodiment of the invention, a computer program product is provided. The computer program product may be any type of computer readable object such as a disk or tape. The computer program product has a computer-readable medium including computer program logic encoded thereon for receiving an optimized data stream of cells. The computer program, when executed on a computer processor, causes the processor to perform the steps of receiving a portion of a cell and determining, based on the portion of the cell, if the cell is associated with a formerly received cell. If so, the computer logic appends a formerly saved portion of a formerly received cell to the cell, and if not, saves a portion of the cell as a saved portion. The cell is then subjected to further processing.

The present invention overcomes the aforementioned prior art problems of achieving optimal bandwidth over communications links by reducing the amount of redundant data being sent over those links.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2A is a representation of the format of an standard ATM cell and ATM cell header as used in prior art unoptimized systems.

DETAILED DESCRIPTION OF THE INVENTION

Figure 1:
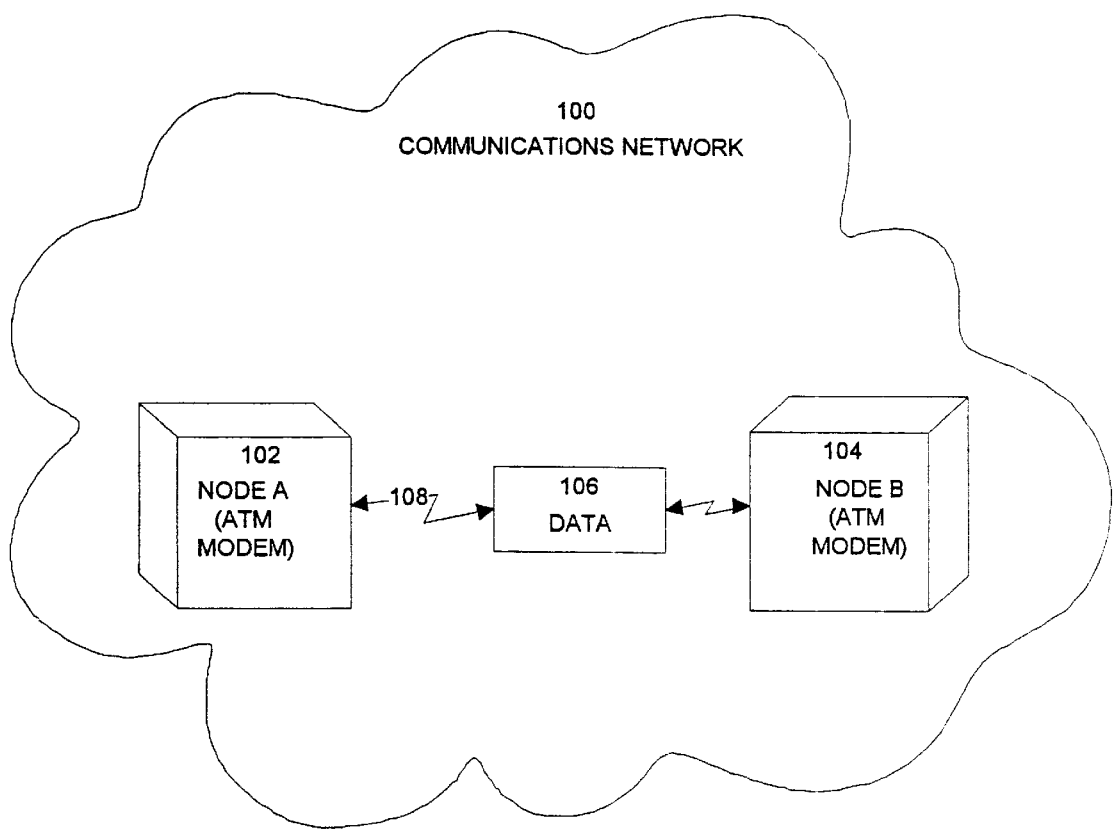
FIG. 1 is a block diagram illustrating a communications network configured according to this invention.

FIG. 1 illustrates a communications network 100 configured according to the present invention. The communications network contains a node A 102 for sending and/or receiving data 106 over a link 108 to/from node B 104. Node A and B may, for example, be ATM or ADSL modems and/or switches. The data 106 includes a portion containing addressing information as well as another portion which contains the actual information to be transmitted.

Examples of ATM and data communications switching equipment in which the present invention may be implemented are the Cisco LightStream 1010 ATM Switch, the Cisco BPX8600 Series Wide-Area Switch, the Cisco ATM Cable Interface Processor (ACIP), and the Cisco ATM 25 Mbps Network Module, all of which are manufactured by Cisco Systems, Inc. of San Jose, Calif.

Figure 2B:
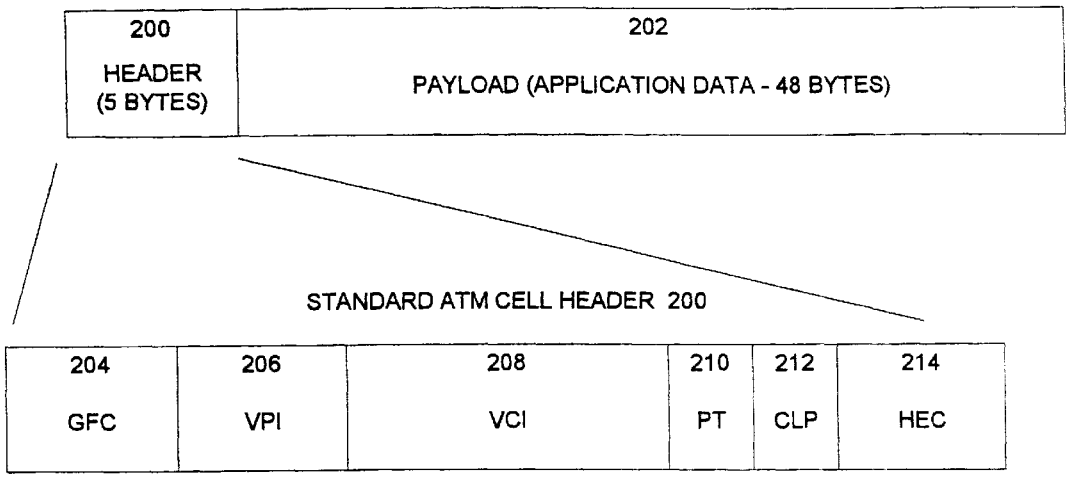
FIG. 2B is a representation of the optimized ATM cells created according to this invention.

FIG. 2A illustrates the format of a standardized ATM cell 218 and FIG. 2B contrasts this format with an optimized ATM cell 328 as created and transmitted according to this invention. ATM cell 218 is one of the types of data that can be processed by this invention. The ATM cell format is defined by the ITU-T and consists of the header 200 and a payload 202 portion. The payload 202 is defined to be 48 bytes in length and the header 200 is defined to be 5 bytes in length. The total length of a standard ATM cell 218 is 53 bytes. Also shown in FIG. 2B is the format of two types of optimized ATM cells 328 and 349 created by the present invention. Optimized ATM cell 328 only contains 48 bytes and includes no header information. Optimized ATM cell 349 is 49 bytes in total length and includes a payload field 202 and a header field 214. Preferably, the header field 214 in optimized cell 349 is the HEC field 214 as obtained form the ATM cell before optimization according to this invention. As will be explained, optimized ATM cells 328 and 349 are novel in and of themselves and are an aspect of this invention, along with the processing procedures and apparatus used to create and transmit the optimized cells 328 and 349. While ATM optimization is one of the preferred embodiments of the invention, the invention is also applicable to optimization of other types of data, such as data transmitted according to DSL and ADSL protocols.

The standard ATM cell header 200 contains addressing information for the ATM cell 218 and consists of the following fields:

GFC 204—4 bits of generic flow control that can be used to provide local functions, such as identifying multiple stations that share a single ATM interface. The GFC field is typically not used and is set to a default value.

VPI 206—8 bits of virtual path identifier, which is used, in conjunction with the VCI, to identify the next destination of a cell as it passes through a series of ATM switches on its way to its destination.

VCI 208—16 bits of virtual channel identifier, which is used, in conjunction with the VPI, to identify the next destination of a cell as it passes through a series of ATM switches on its way to its destination.

PT 210—3 bits of payload type. The first bit indicates whether the cell contains user data or control data. If the cell contains user data, the second bit indicates congestion, and the third bit indicates whether the cell is the last in a series of cells that represent a single ATM Adaption Layer 5 ("AAL5") frame.

CLP 212—1 bit of congestion loss priority, which indicates whether the cell should be discarded if it encounters extreme congestion as it moves through the network.

HEC 214—8 bits of header error control, which is a checksum calculated only on the first four bytes of the header itself. That is, HEC is a checksum on the GFC, VPI, VCI, PT and CLP fields.

Note that in a preferred embodiment, optimized ATM cell 328 contains no addressing information. Accordingly, transmission of optimized ATM cells 328 maximizes the use of network bandwidth and requires no link or header mechanisms, as will be explained. Since only the payload or application data is transferred, increases in throughput are obtained using the invention that are otherwise not possible using prior art header and address compression schemes.

Figure 2B:
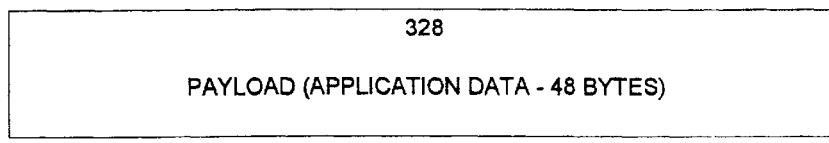
Figure 2B:
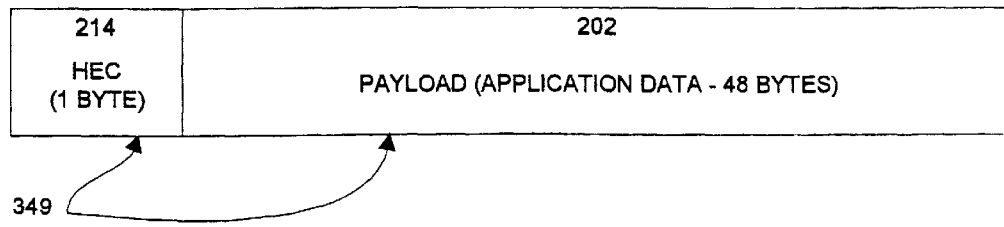

The invention is based in part on the observation that communications applications often send large amounts of data that must be packaged into smaller packets (e.g., ATM cells). As such, the addressing information in the header portion of each of those packets is often identical to the previous packet or cell processed. Since a standard cell in ATM is only 53 bytes long, and only contains 48 bytes of actual application data (i.e., payload 202 in FIG. 2), it may take many hundreds or thousands of cells to transmit a single block of useable application data (i.e., a web page, complete document, applet, or other data) from a sender to a receiver. As will be explained in detail, the invention recognizes this redundancy and the pitfalls of prior art header and address compression systems and optimizes the amount of data transmitted over a communications link by eliminating redundant data in the header fields of cells that have a common destination, as determined by cell header information.

Figure 3:
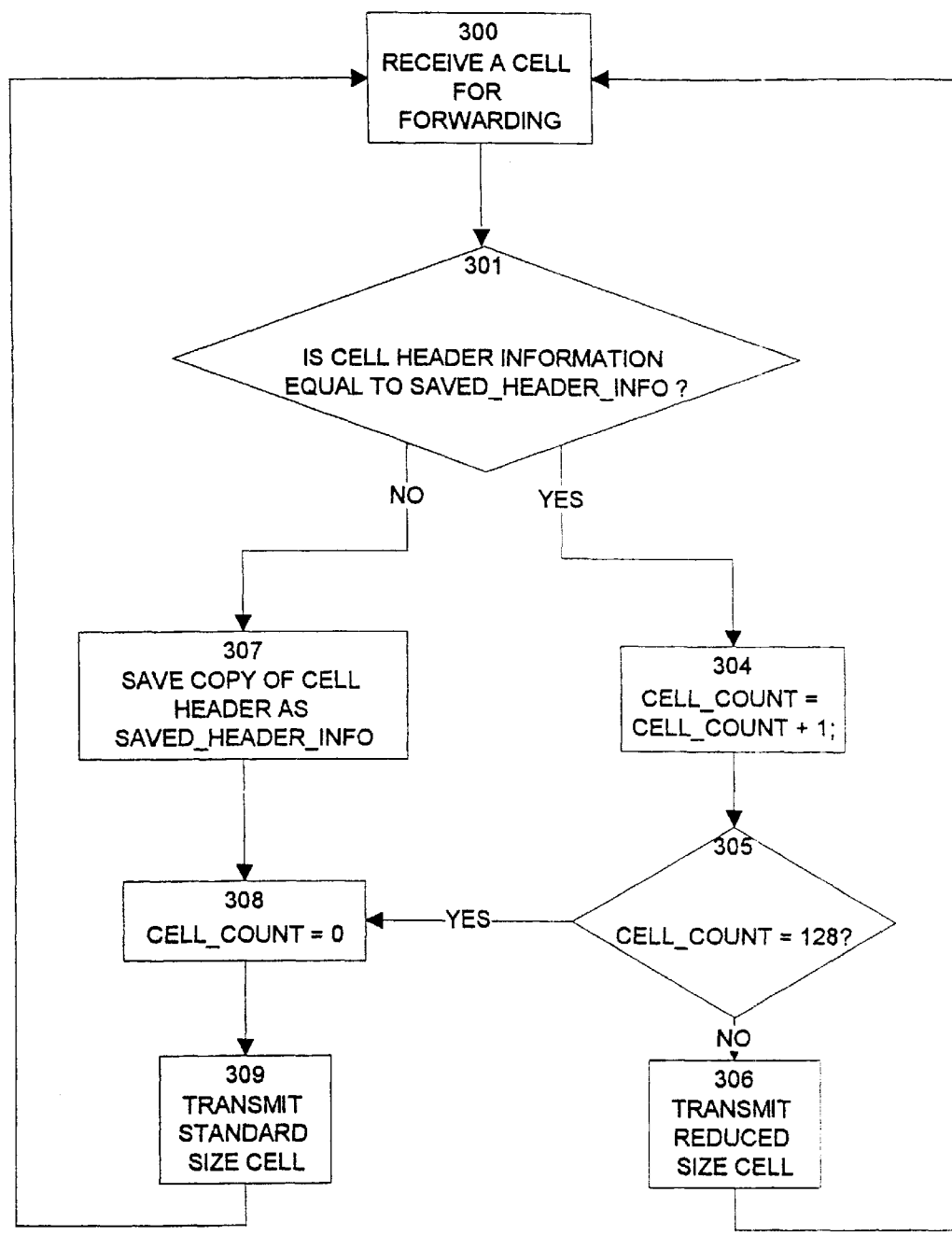
FIG. 3 illustrates a flow chart of the processing performed by the cell transmission optimization process of this invention.
Figure 4:
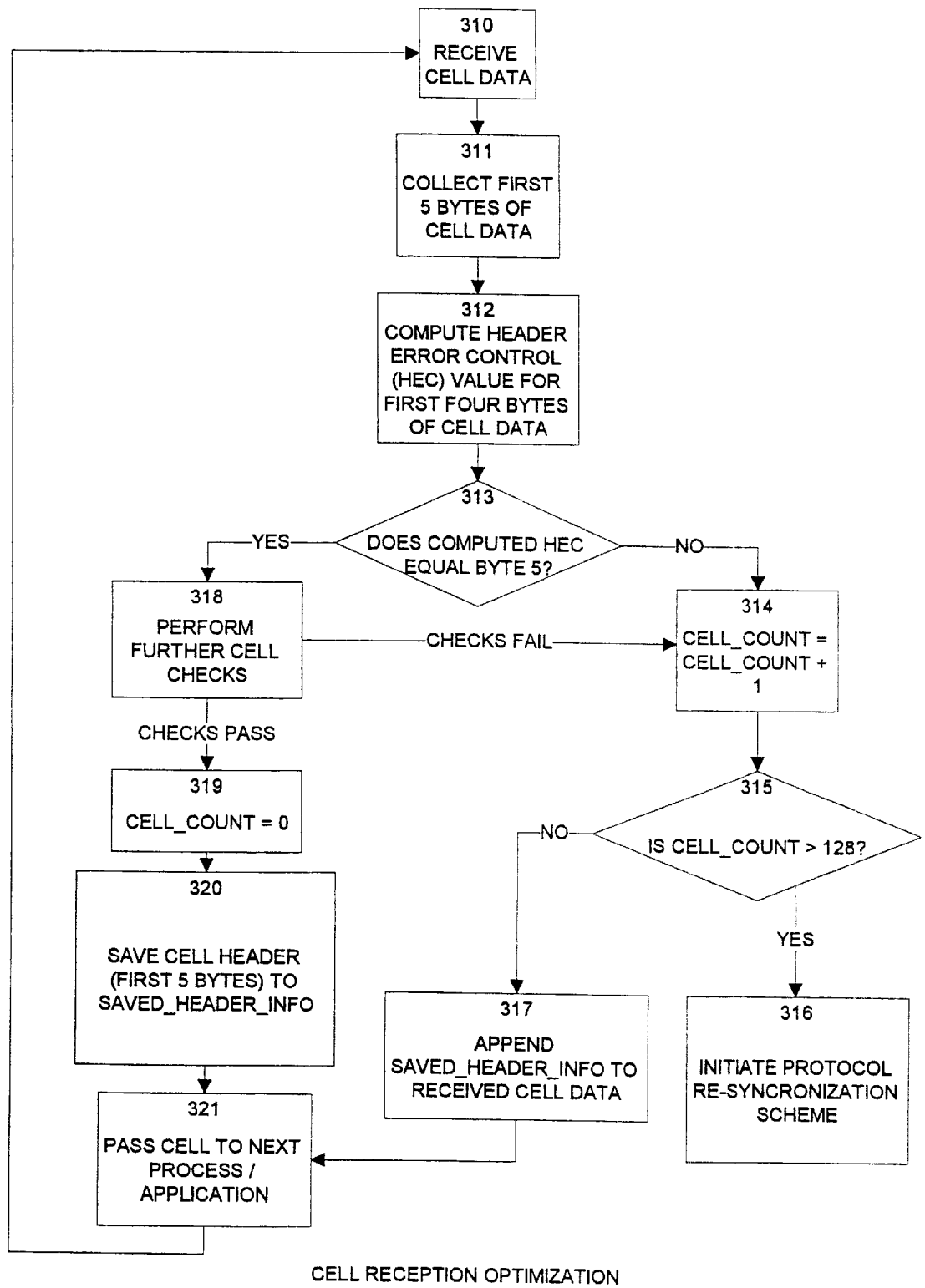
FIG. 4 illustrates a flow chart of the processing performed by the cell reception optimization process of this invention.

FIGS. 3 and 4 illustrate the processing steps for optimizing the transmission (FIG. 3) and reception (FIG. 4) of a stream of data, which in this example and in a preferred embodiment is a stream of ATM cells. The processing steps in FIGS. 3 and 4 are preferably implemented within a data communications processing device such as an ATM modem or ATM switching device, such as those noted above produced by Cisco Systems. The processing steps of FIGS. 3 and 4 may also be incorporated into each data communications device that switches, transmits or propagates a cell across a network, such as any ATM switches, routers, hubs, bridges, or other local or wide area network communication devices which exist between a sender and a receiver of ATM cells.

Assume for this example that the processing in FIG. 3 is being described as an operation within ATM data transmission equipment coupled to a computer host that is sending a stream of data, such as a web page, to a receiving computer host located elsewhere on a computer network (i.e., Nodes A and B 102, 104 on computer network 100 in FIG. 1). The sending computer host passes application data which may be encapsulated by one or more upper level data communication protocols (i.e. IP packets or frames) to the ATM equipment (i.e., ATM switch) which uses the processing of this invention.

The ATM equipment apportions the packets or frames of data into standard size ATM cells containing the five byte header (200 in FIG. 2A) and the 48 byte payload 202. Once the payload data 202 is formatted into cells, each cell is received at step 300 and a portion of the header 200 of the cell is compared in step 301 against a previously saved header portion called SAVED_HEADER_INFO (obtained/copied from a previously processed cell of data, or empty if cells have not yet been processed). Any portion of the cell header (i.e., one or more of fields 204, 206, 208, 210, 212 and 214) may be compared for a match in step 301, but preferably, the entire header 200 is compared to the SAVED_HEADER_INFO. If the current cell header 200 of the current cell being processed is equivalent to the SAVED_HEADER_INFO that was previously saved, then the current cell may be transmitted without a header, as an optimized ATM cell 328.

To transmit a cell without a header, the processing path beginning with step 304 is performed which increments a CELL_COUNT variable to track how many optimized cells have been transmitted. The purpose of CELL_COUNT will be explained in detail later. At step 305, if the CELL_COUNT variable is not equal to a value of 128, step 306 transmits a reduced size (i.e., an optimized) ATM cell, which consists only of the 48 byte payload 202. That is, the optimized ATM cell transmitted in step 306 has a format that appears as optimized ATM cell 328 in FIG. 2. After the optimized ATM cell (i.e., payload field 328) is transmitted over the network to the next ATM receiver, processing returns to step 300 to get the next cell in the data stream being provided by the application on the sending computer host.

According to the processing path of steps 300, 301, 304, 305 and 306, bandwidth is maximized since no cell header overhead is incurred during transmission of cell having similar headers. Before a description of the operation of an ATM receiver configured according to the invention is given, the alternate processing paths of FIG. 3 will first be explained in detail.

In step 301, if the current cell header is not equal to the SAVED_HEADER_INFO from a previously saved header portion (i.e., the current cell header is different than the formerly transmitted cell header), step 307 saves a copy of the current cell header into the SAVED_HEADER_INFO variable. Preferably, step 307 saves all five bytes of the header of the current cell to be transmitted. Once step 307 has saved the header information, step 308 clears the CELL_COUNT variable to zero and step 309 transmits the current ATM cell as a standard sized, 52-byte, ATM cell 218.

The processing in FIG. 3 recognizes that cell headers that differ from one cell to the next indicate certain conditions. Header changes may indicate the end of a continuous data stream of cells (i.e., the end of the web page transmission), or may indicate a change in cell destination (i.e., cells destined for a new host receiver), or may indicate other information such as an error or a change in connection priority. Whatever the case may be, step 301 detects any cell with a different header and step 307 saves a copy of this header information and steps 308 and 309 clear the cell count and transmit the full sized standard cell.

The other alternative processing paths that exists in the processing of FIG. 3 is at step 305. Typically in step 305, the CELL_COUNT variable will not equal 128 and step 306 will transmit an optimized cell. However, when CELL_COUNT is equal to 128, step 308 and 309 are performed to clear the CELL_COUNT variable and to transmit a full sized cell. Thus, if a stream of hundreds or thousands of cells is arriving at step 300 and each has the same header, every $128^{th}$ cell will be transmitted as a full 53 byte un-optimized cell. The transmission of a standard sized cell is done to allow a receiver that may be out of synchronization with the sender to detect the full sized cell, as will be explained. It is to be understood that the number of optimized cells transmitted between full sized cells in a continuous stream of same header cells is not limited to being equal to 128. Rather, any number may be used and can be determined by average error rates and transmission conditions for a sending/receiving network connection. Thus, if high error rates were common, the invention contemplates lowering the CELL_COUNT limit to, for example, 64 or 32 cells. This causes a full sized ATM cell to be transmitted more often which helps the receiver maintain synchronicity with the sender, as will be explained.

In this manner, the processing of FIG. 3, which is implemented in a data transmission devices such as an ATM or ADSL switch or modem, can significantly increase overall throughput and bandwidth usage since the headers of redundant header cells are not transmitted. When redundant headers occur, only the data portion or payload 202 of a cell is transmitted onto the network to the receiver.

FIG. 4 illustrates the processing steps performed by receiving ATM equipment which is receiving all cells transmitted by the sender that is performing the processing of FIG. 3. In FIG. 4, step 310 begins by receiving cell data, as it is transmitted from the sender via steps 309 and/or 306. In step 311, the first five bytes of cell data are collected. Step 312 then computes a Header Error Control Value (HEC) on the first four bytes of data received, using a standardized HEC computation algorithm such as a CRC checksum or other algorithm. Step 313 then compares the computed HEC value determined in step 312 with the value of the fifth byte of cell data received. If the computed HEC value and the fifth byte are not equal in step 313, processing proceeds to step 314 where CELL_COUNT is incremented. If the computed HEC value (Step 312) does not equal the fifth byte received for a cell, one of two conditions is indicated: First, the cell being received is a 48 byte cell, or second, the receiver is out of synchronicity with the sender.

Accordingly, if the computed HEC does not equal the fifth byte received, step 315 then determines if CELL_COUNT is equal to 128. If CELL_COUNT is not equal to 128, the cell being received is merely an optimized cell and step 317 appends the SAVED_HEADER_INFO to the received cell data (i.e., appends SAVED_HEADER_INFO to received cell payload 328). Next, step 321 passes the 53 byte cell, which is now complete with a header, on to the next process or application.

In step 315, if the variable CELL_COUNT does equal 128, then step 316 is called to initiate an ATM protocol re-synchronization scheme. An ATM re-synchronization scheme is a process known to those skilled in the art of ATM switching protocols which allows ATM sender and receiver equipment to get back in synchronization with each other so that the receiver can detect cell boundaries. The reason this is needed is that on transmission of the $128^{th}$ cell, step 313 should detect that the computed HEC (Step 312) and the fifth cell byte received are equal. If they are not equal for every $128^{th}$ cell transmission, which should always be a full 53 byte un-optimized cell transmission, then an error has occurred. It may be that the error is an error with this one cell. More likely, the sender and receiver are out of synchronization with each other and the re-synchronization protocol is used to regain synchronization. After step 316, step 317 clears the CELL_COUNT back to 0 and returns processing to step 310 to process more cells.

In step 313, if the computed HEC from step 312 does equal the fifth byte received, then chances are that a full sized 53-byte un-optimized cell has been (or is being) received. This is the case because if an optimized cell without header information is being transmitted from the sender (i.e., only payload data is being sent), the chances are about 1 in 255 (i.e., the number of values representable by one byte) that the fifth byte of payload data will be exactly equal to a computed HEC value obtained from the first four bytes in step 312. Thus, if the HEC and fifth byte values are equal in step 313, step 318 performs further header checks on other portions of cell header fields to ensure that the cell bytes received are for a 53 byte cell. As an example, step 318 can perform checks such as ensuring the VPI and VCI bit fields 206, 208 in the first four bytes of received data indicate valid destination path and channel identifiers.

Alternatively or in addition, in step 318, the payload type field PT 210 can be examined to determine that the payload is of a valid data type. Even further checks can be performed on portions of actual data received to determine if the data appears to have a format which could be equivalent to the type indicated in the PT field 210.

If the checks in 318 fail, then processing proceeds to step 314 and assumes that the rare case occurred where the fifth byte of an optimized cell happened to equal the computed HEC value on the first four byte of payload data. If processing passes from step 318 to step 314, processing proceeds from step 314 as explained above. Step 318 is used primarily as a backup check to detect rare instances that may occur, by chance, when a computed HEC value in step 312 equals the $5^{th}$ byte of payload cell data in step 313.

Assuming that the checks in step 318 pass and the cell received is truly a 53 byte cell, step 319 clears the CELL_COUNT counter to zero and step 320 saves the value of the five bytes in the received cell header in the SAVED_CELL_HEADER variable. Step 321 then passed the full sized cell on the next switching process or application.

In this manner, the processing of FIG. 4 is able to detect what type of cell is being received; either an un-optimized standard length 53-byte ATM cell, or an optimized 48 byte payload only cell. If only the payload is being transmitted from the sender, the stream of cells are all associated with a common header which is not transmitted, but which is saved once and appended in step 317 as each payload only optimized cell is received. Optimized payload-only cells will rarely ever contain a fifth byte that equals a computed HEC value based on the first four bytes of data. Even if this is the case, the additional checks that can be performed in step 318 will detect an optimized cell with this rare condition and will re-direct processing back to the optimized processing steps beginning at step 314.

It is to be understood that step 310 in the receiver processing buffers all of the cell bytes received, no matter what they contain. The processing steps 311 through 321 have access to the buffer of cell bytes. Accordingly, step 317 can remove the 48 bytes of payload data from the buffer and appends the SAVED_CELL_HEADER VARIABLE to this data. Likewise, if step 321 is entered from step 320, the 53 bytes of data can be removed from the incoming cell buffer. Depending upon the processing path taken at step 313, either a 53 byte cell is received or a 48 byte optimized cell is received, and steps 317 and/or 321 can remove the bytes of data from the received data buffer once the cell has been processed according to this invention.

In an alternative embodiment of the invention, the cell sender processing shown in FIG. 3 can transmit an optimized cell as a 49 byte cell instead of a pure payload-only 48-byte cell. The extra bit transmitted in this alternative embodiment is the HEC field of the cell. Thus, in this embodiment, processing in the sender (i.e., FIG. 3 processing) is the same, except that step 306 transmits a reduced size cell including the one byte HEC field 214 of the cell header as well as the 48 byte payload field.

Figure 5:
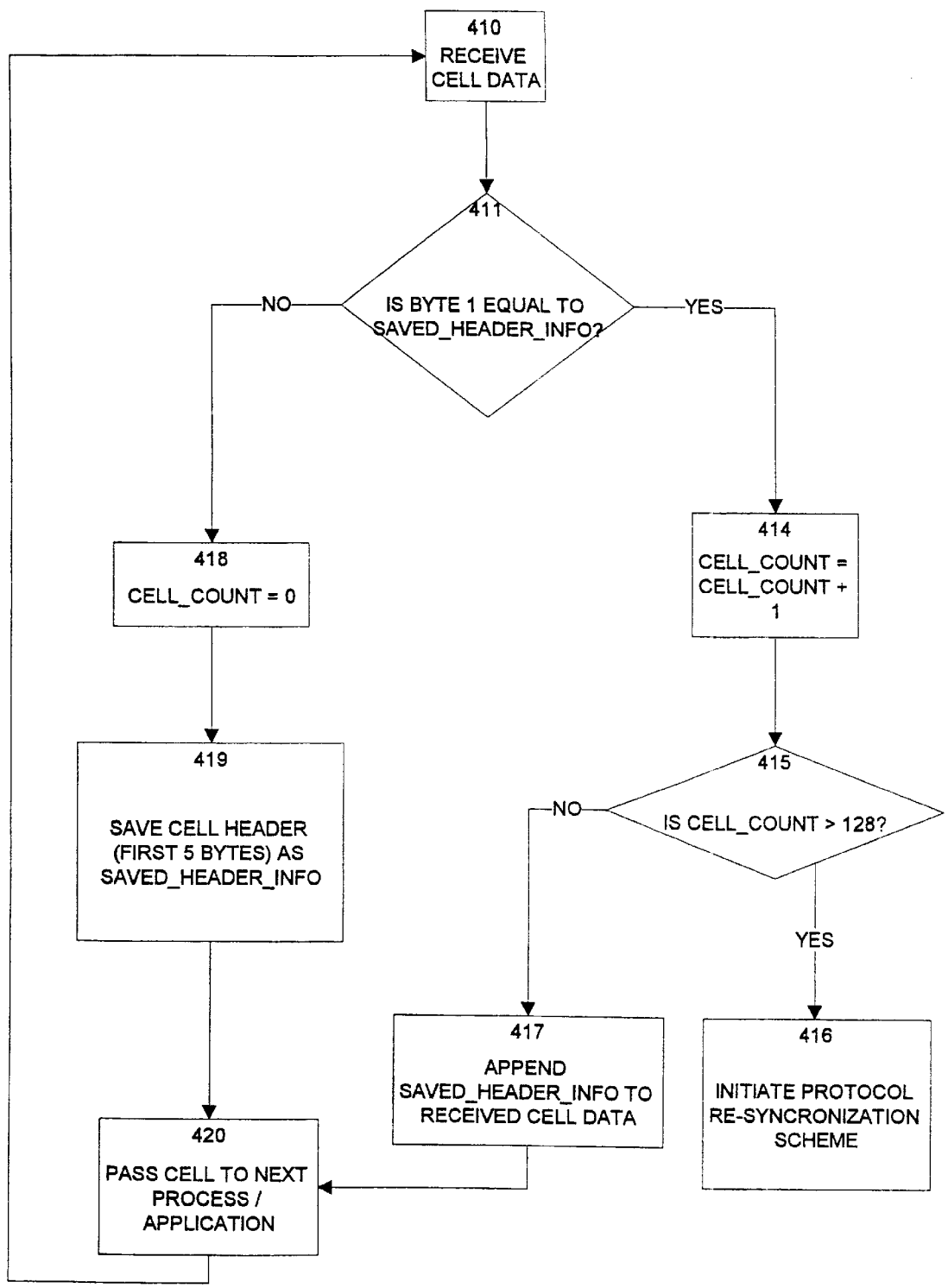
FIG. 5 is a flow chart of alternative processing performed by the cell reception optimization process of this invention.

FIG. 5 illustrates the processing of the receiving end of this alternative embodiment. The processing of FIG. 5 is similar to that of FIG. 4, except that steps 311, 312 and 313 have been reduced to a single step 411. Thus, data is received at step 410 and step 411 determines if the first byte of data received is an HEC field that is equal to the SAVED_HEADER_FIELD variable. If the two values are equal, the received cell transmission is an optimized 49-byte cell and the processing steps of 414 through 417 are followed, just as explained previously for steps 314 through 317. If the first byte received is not equal to the SAVED_HEADER_FIELD in step 411, then processing proceeds to step 418 and assumes that the incoming cells are for a 53 byte cell. Step byte 5) from the current cell in the SAVED_HEADER_FIELD variable. Step 320 proceeds as previously explained to pass the cell to the next switching process or to the receiving application.

In the case of either embodiment, the present invention avoids the use of complicated sender-side link calculations and maintenance issues having to do with link tables. In the preferred embodiment, the invention allows even further reduction in the bandwidth usage and thus allows even greater throughput than prior art header compression systems.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for propagating a data stream of cells, comprising:

comparing a first portion of a cell of the data stream against a previously saved first portion of a former cell of the data stream;

transmitting an optimized second portion of the cell of the data stream if the previously saved first portion of the former cell of the data stream equals the first portion of the cell of the data stream, without disrupting a sequence of cells of the data stream, wherein the optimized second portion of the cell of the data stream is smaller in size than an entire portion of the cell of the data stream; and saving the first portion of the cell of the data stream if the previously saved first portion of a former cell of the data stream does not equal the first portion of the cell of the data stream and transmitting an entire portion of the cell of the data stream, the saving step resulting in a new saved first portion of a cell of the data stream.

2. The method of claim 1 wherein the cell of the data stream is an ATM cell having an ATM cell header and a payload;

the saved first portion of the cell of the data stream is a portion of the ATM cell header; and the transmitting an optimized second portion of the cell step further comprises the step of:
   removing the ATM cell header from the ATM cell and transmitting the payload as a cell.

3. The method of claim 2, wherein if the transmitting an optimized second portion of the cell step is performed, a cell counter is incremented and if the cell counter is equal to a predetermined value, the cell counter is cleared and the step of transmitting an entire portion of the cell of the data stream is performed.

4. A computer program product having a computer-readable medium including computer program logic encoded thereon for optimizing transmission of a data stream of cells, such that the computer program, when executed on a computer processor, causes the processor to perform the steps of:
   comparing a first portion of a cell of the data stream against a previously saved first portion of a former cell of the data stream;
   transmitting an optimized second portion of the cell of the data stream if the previously saved first portion of the former cell of the data stream equals the first portion of the cell of the data stream, without disrupting a sequence of cells of the data stream, wherein the optimized second portion of the cell of the data stream is smaller in size than an entire portion of the cell of the data stream; and
   saving the first portion of the cell of the data stream if the previously saved first portion of a former cell of the data stream does not equal the first portion of the cell of the data stream and transmitting an entire portion of the cell of the data stream, the saving step resulting in a new saved first portion of a cell of the data stream.

5. A method for transmitting an optimized stream of cells within a communications network comprising the steps of:

receiving a cell to be transmitted;

comparing a portion of the cell against a previously saved portion of a formerly transmitted cell;

transmitting a portion of the cell that is smaller in size than the entire cell if the previously saved portion of the formerly transmitted cell equals the portion of the cell to which it was compared, the transmitting step resulting in an optimized transmission of the cell; and if the previously saved portion of the formerly transmitted cell does not equal the portion of the cell to which it was compared, saving the portion of the cell compared as a new portion which replaces the previously saved portion of a formerly transmitted cell and transmitting the cell in its entirety.

6. The method of claim 5 wherein cell includes a header and a payload and wherein the optimized transmission of a cell results in the transmission of only the payload of the cell as an optimized cell.

7. The method of claim 5 wherein cell includes a header and a payload and wherein the optimized transmission of a cell results in the transmission of a header error control portion of the header in conjunction with the payload of the cell, together as an optimized cell.

8. The method of claim 5 further including the step of upon detecting a predetermined number of successive transmissions of optimized cells, transmitting a cell in its entirety and resetting a mechanism to detect the predetermined number of successive transmissions of optimized cells.

9. A method for receiving a stream of cells comprising:

receiving a portion of a current cell;

determining based on the portion of the current cell, if the current cell is associated with a formerly received cell, and if so, appending a formerly saved portion of the formerly received cell to the current cell, and if not, saving a portion of the current cell as a saved portion;

providing the current cell to subsequent processing; wherein the step of receiving collects a portion of information of the current cell; and wherein the step of determining comprises the steps of calculating a calculated header value based upon the portion of information from the current cell that was received;

comparing the calculated header value with a value in the portion of information from the current cell, and if they are not the same, determining that the current cell is associated with the formerly received cell, and if they are the same, determining that the current cell is not associated with the formerly received cell.

10. The method of claim 9, wherein if it is determined that the current cell is not associated with the formerly received cell, a step of performing further checks on the current cell is initiated to ensure that the current cell is not associated with the formerly received cell.

11. A method for receiving a stream of cells comprising:
receiving a portion of a current cell;
determining, based on the portion of the current cell, if the current cell is associated with a formerly received cell, and if so, appending a formerly saved portion of the formerly received cell to the current cell, and if not, saving a portion of the current cell as a saved portion;
providing the current cell to subsequent processing;
wherein the step of receiving collects header information for the current cell; and wherein the step of determining comprises the step of
comparing a formerly saved header value with a header value in the header information from the current cell, and if they are the same, determining that the current cell is associated with the formerly received cell and if they are not the same, determining that the current cell is not associated with the formerly received cell.

12. A computer program product having a computer-readable medium including
computer program logic encoded thereon for receiving an optimized data stream of cells, such that the computer program when executed on a computer processor, causes the processor to perform the steps of:
receiving a portion of a current cell;
determining based on the portion of the current cell, if the current cell is associated with a formerly received cell, and if so, appending a formerly saved portion of the formerly received cell to the current cell, and if not, saving a portion of the current cell as a saved portion;
providing the current cell to subsequent processing;
wherein, within the computer program logic, the step of receiving collects a portion of information of the current cell; and
wherein the step of determining comprises the steps of calculating a calculated header value based upon the portion of information from the current cell that was received; and
comparing the calculated header value with a value in the portion of information from the current cell, and if they are not the same, determining that the current cell is associated with the formerly received cell, and if they are the same, determining that the current cell is not associated with the formerly received cell.

13. An apparatus for transmitting and receiving an optimized stream of cells within a communications network comprising:
a transmission module including:
a outbound cell receiver receiving a cell to be transmitted;
a comparer coupled to the outbound cell receiver, the comparer comparing a portion of the cell against a previously saved portion of a formerly transmitted cell;
a transmitter coupled to the comparer, the transmitter transmitting a portion of the cell that is smaller in size than the entire cell if the previously saved portion of the formerly transmitted cell equals the portion of the cell to which it was compared as indicated by the comparer, the transmitter transmitting an optimized transmission of the cell; and
if, as determined by the comparer, the previously saved portion of the formerly transmitted cell does not equal the portion of the cell to which it was compared, the comparer saving the portion of the cell compared as a new portion which replaces the previously saved portion of a formerly transmitted cell and the transmitter transmitting the cell in its entirety.

14. The apparatus of claim 13 further comprising:
a cell reception module including:
an inbound cell receiver receiving a portion of a cell;
a cell processor coupled to the inbound cell receiver, the cell processor determining, based on the portion of the cell, if the cell is associated with a formerly received cell, and if so, appending a formerly saved header portion of a formerly received cell to the cell, and if not, saving a portion of the cell as a saved header portion;
the cell processor including an output providing the cell to a subsequent processor.

15. The apparatus of claim 14 further wherein:
the inbound cell receiver collects a portion of information of the cell; and
wherein the cell processor calculates a calculated header value based upon the portion of information from the cell that was received and compares the calculated header value with a value in the portion of information from the cell, and if they are not the same, the cell processor determines that the cell is an optimized cell associated with a formerly received cell, and if they are the same, the cell processor determines that the cell is not associated with a formerly received cell.

16. The apparatus of claim 15, wherein if the cell processor determines that the cell is not associated with a formerly received cell, the cell processor performs further checks on the cell to ensure that the cell is not associated with a formerly received cell.

17. The apparatus of claim 15, wherein the cell processor detects a predetermined number of successively received cells which are associated with one another, and upon exceeding the predetermined number, the cell processor initiates a resynchronization scheme to allow further detection of cells.

18. The apparatus of claim 14 wherein:
the inbound cell receiver collects header information for the cell; and
wherein the cell processor compares a formerly saved header value with a header value in the header information from the cell, and if they are the same, the cell processor determines that the cell is associated with a formerly received cell, and if they are not the same, the cell processor determines that the cell is not associated with a formerly received cell.

19. The apparatus of claim 14, wherein the transmission module receives multiple stream of cells and wherein the outbound cell receiver receives a cell from each stream to be transmitted and wherein the comparer compares a portion of a cell of each stream against a previously saved portion of a formerly transmitted cell associated with that stream and wherein the transmitter transmits a portion of each cell that is smaller in size than the entire cell if the previously saved portion of the formerly transmitted cell associated with that stream equals the portion of the cell to which is was compared as indicated by the comparer, the transmitter transmitting an optimized transmission of the cells for each stream.

20. A computer program product comprising:
a computer usable medium for transmitting an optimized stream of cells within a communications network;
a set of computer program instructions embodied on the computer usable medium, including instructions to:

receive a cell to be transmitted;

compare a portion of the cell against a previously saved portion of a formerly transmitted cell;

transmit a portion of the cell that is smaller in size than the entire cell if the previously saved portion of the formerly transmitted cell equals the portion of the cell to which it was compared, the transmit instruction resulting in an optimized transmitted of the cell; and if the previously saved portion of the formerly transmitted cell does not equal the portion of the cell to which it was compared, save the portion of the cell compared as a new portion which replaces the previously saved portion of a formerly transmitted cell and transmit the cell in its entirety.

21. The computer program product of claim 20 wherein the cell includes a header and a payload and wherein the optimized transmission of a cell results in the transmission of only the payload of the cell as an optimized cell.

22. The computer program product of claim 20 wherein the cell includes a header and a payload and wherein the optimized transmission of a cell results in the transmission of a header error control portion of the header in conjunction with the payload of the cell, together as an optimized cell.

23. A computer program product comprising:

a computer usable medium for receiving a stream of cells;

a set of computer program instructions embodied on the computer usable medium, including instructions to:

receive a portion of a current cell;

determine, based on the portion of the current cell, if the current cell is associated with a formerly received cell, and if so, append a formerly saved portion of the formerly received cell to the current cell, and if not, save a portion of the current cell as a saved portion;

provide the current cell to subsequent processing; wherein the instruction to receive collects header information for the current cell; and wherein the instruction to determine comprises instructions to:

compare a formerly saved header value with a header value in the header information from the current cell, and if they are the same, determine that the current cell is associated with the formerly received cell, and if they are not the same, determine that the current cell is not associated with the formerly receive cell.

24. A data processing system for propagating a data stream of cells, comprising:

means for comparing a first portion of a cell of the data stream against a previously saved first portion of a former cell of the data stream;

means for transmitting an optimized second portion of the cell of the data stream if the previously saved first portion of the former cell of the data stream equals the first portion of the cell of the data steam, without disrupting a sequence of cells of the data stream, wherein the optimized second portion of the cell of the data stream is smaller in size than an entire portion of the cell of the data stream; and means for saving the first portion of the cell of the data stream if the previously saved first portion of a former cell of the data stream does not equal the first portion of the cell of the data stream and transmitting an entire portion of the cell of the data stream, the saving means resulting in a new saved first portion of a cell of the data stream.

25. A data processing system for transmitting an optimized stream of cells within a communications network, comprising:

means for receiving a cell to be transmitted;

means for comparing a portion of the cell against a previously saved portion of a formerly transmitted cell;

means for transmitting a portion of the cell that is smaller in size than the entire cell if the previously saved portion of the formerly transmitted cell equals the portion of the cell to which it was compared the transmitting means resulting in an optimized transmission of the cell; and if the previously saved portion of the formerly transmitted cell does not equal the portion of the cell to which it was compared, saving the portion of the cell compared as a new portion which replaces the previously saved portion of a formerly transmitted cell and transmitting the cell in its entirety.

26. A data processing system for receiving a stream of cells comprising:

means for receiving a portion of a current cell;

means for determining, based on the portion of the current cell, if the current cell is associated with a formerly received cell, a if so, appending a formerly saved portion of the formerly received cell to the current cell, and if not, saving a portion of the current cell as a saved portion;

means for providing the current cell to subsequent processing; wherein the step of receiving collects a portion of information of the current cell; and wherein the step of determining comprises the steps of means for calculating a calculated header value based upon the portion of information from the current cell that was received;

means for comparing the calculated header value with a value in the portion of information from the current cell, and if they are not the same, determining that the current cell is associated with the formerly received cell, and if they are the same, determining that the current cell is not associated with the formerly received cell.

* * * * *